United States Patent
Mellini

(10) Patent No.: US 8,481,107 B2
(45) Date of Patent: Jul. 9, 2013

(54) LEATHER-SURFACE REPAIR-COMPOSITION AND THE METHOD FOR SURFACE REPAIR OF LEATHER SURFACES

(76) Inventor: Joseph Mellini, Wavre (BE)

(*) Notice: Subject to any disclaimer, the term of this patent is extended or adjusted under 35 U.S.C. 154(b) by 0 days.

(21) Appl. No.: 13/462,607

(22) Filed: May 2, 2012

(65) Prior Publication Data

US 2012/0219705 A1  Aug. 30, 2012

Related U.S. Application Data

(62) Division of application No. 12/374,801, filed as application No. PCT/EP2007/006612 on Jul. 25, 2007, now Pat. No. 8,192,791.

(51) Int. Cl.
*B05D 7/12*  (2006.01)

(52) U.S. Cl.
USPC .......................................... 427/140

(58) Field of Classification Search
None
See application file for complete search history.

(56) References Cited

U.S. PATENT DOCUMENTS

| | | | |
|---|---|---|---|
| 1,506,983 A | 9/1924 | Marrs et al. | |
| 3,920,598 A | 11/1975 | Reiff et al. | |
| 4,507,413 A | 3/1985 | Thoma et al. | |
| 5,264,242 A | 11/1993 | Speer | |
| 6,228,926 B1 * | 5/2001 | Golumbic | 524/489 |
| 6,357,845 B1 * | 3/2002 | Kuwabara et al. | 347/3 |

FOREIGN PATENT DOCUMENTS

| | | |
|---|---|---|
| CN | 1184160 A | 12/1997 |
| DE | 2 245 077 | 9/1972 |
| DE | 195 10 242 B4 | 3/1995 |
| EP | 0 071 420 | 7/1982 |
| EP | 0 492 608 | 12/1991 |
| EP | 0 572 353 B1 | 5/1993 |
| EP | 0 927 271 | 9/1997 |
| JP | 2005-264130 | 3/2004 |

OTHER PUBLICATIONS

International Search Report for PCT/EP2007/006612.

* cited by examiner

*Primary Examiner* — Randy Gulakowski
*Assistant Examiner* — Jeffrey Washville
(74) *Attorney, Agent, or Firm* — Rankin, Hill & Clark LLP

(57) ABSTRACT

Leather-surface repair set consisting at least of a degreaser and of a composition comprising an emulsion of polyurethane and at least one pigment component and further comprising at least one further component which allows to relatively increase or decrease the elasticity of the reacted composition. Particularly, a 2-ethylhexyl-, 2-isodecyladipate and/or triisodecylphosphate are used as the further component. A method for surface repair of leather surfaces with the steps of treating the surface area to be repaired with a degreasing agent, applying a repair composition at least consisting of an emulsion of polyurethane to the spots to be repaired by filling the surface spots to be repaired with said emulsion and allowing the emulsion to polymerize.

21 Claims, 3 Drawing Sheets

Figure 1A:
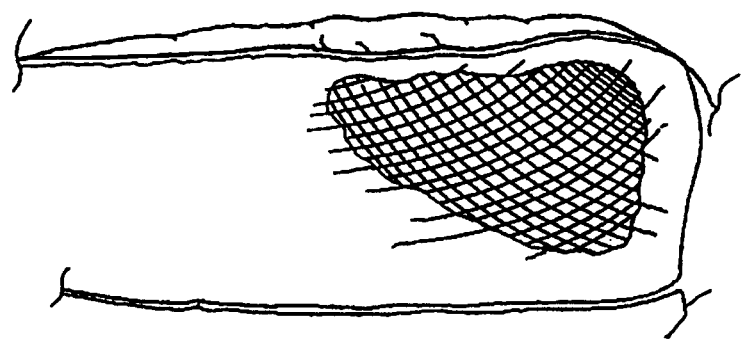
Figure 1B:
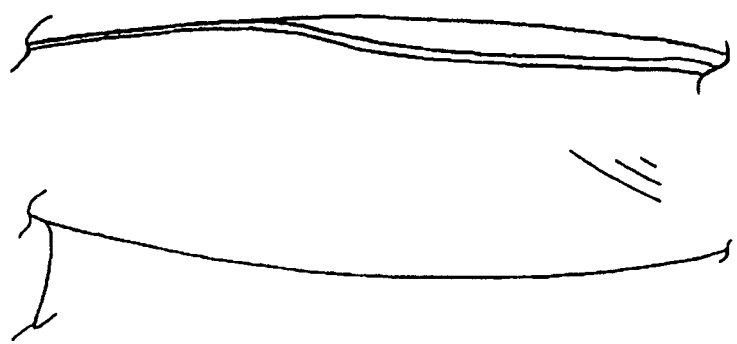

006612, filed Jul. 25, 2007, which
LEATHER-SURFACE REPAIR-COMPOSITION AND THE METHOD FOR SURFACE REPAIR OF LEATHER SURFACES This application is a Divisional of pending application Ser. No. 12/374,801 filed on Feb. 23, 2009, which claims priority to and the benefit of the filing date of International Application No. PCT/EP2007/006612, filed Jul. 25, 2007, which application claims priority to and the benefit of the filing date of European Application No. 06015432.5, filed Jul. 25, 2006, all of which are hereby incorporated by reference into the specification of this application.

FIELD OF THE INVENTION

The invention refers to a leather surface repair set and a method for surface repair for leather surfaces.

BACKGROUND OF THE INVENTION

For coloring and fosterage of highly utilized leather surfaces, like car seats, steering-wheels, motorcyclist's clothes and equipment and the like various compositions and methods of applying such compositions are known:

EP 0 572 353 A1 describes a method of coloring leather with a polyazo dye with at least two sulphur groups and some alkali halogenide.

EP 0 071 420 B2 describes a method of after tanning of leather of oligomers on acryl basis.

EP 0 492 608 A2 describes a process for producing leather comprising the steps of pretreatment, tanning and finishing, the finishing steps including treatment with fatting agent and top finish. A fatting agent for leather is also known from DE-C-22 45 077.

JP 2005 264130 A1 describes a preserving cream for leather without using volatile components or vaseline which is stable for a long period without degradation and applicable to all leather products.

EP 0 927 271 B1 describes a leather-treatment agent which is obtained by polymerization of 70-100 wt.-% acrylic acid and/or methacrylic acid and/or the acid chlorides and/or anhydrides thereof with 0-30 wt.-% of other water-soluble monomers copolymerizable with the first component and 0-20 wt.-% of water insoluble monomers copolymerisable with the two first components. Said polymer being reacted with amines of formula $R_1$—NH—$R_2$, wherein $R_1$ represents a $C_{12}$-$C_{30}$ alkyl or alkenyl residue and $R_2$ represents H, a $C_1$-$C_4$ alkyl or $C_1$-$C_2$ hydroxyalkyl residue. Such leather treatment agents are used producing low-fogging leathers, i.e. leathers which do not deliver too much material which may condense on the surface of the window panels of a car, i.e. without making the window panel too foggy.

Chinese Publication 2002-68 31 96 (XP 002143103) proposes a polyurethane leather repairing agent consisting amongst others a distilled water and a thickener being used to simplify leather repair processes.

DE 195 10 242 A1 discloses a leather sheet which is covered on its outer side with a polyurethane containing watery dispersion. This cover layer is prefabricated in a mould with a surface comparable to the original leather. This prefabricated cover layer is used to ennoble a leather sheet by giving the characteristic look of natural leather to the leather sheet.

U.S. Pat. No. 4,507,413 discloses an aqueous polyurethane reactive coating composition suitable for coating leather and other materials and also containing thickeners and pigments.

All said compositions are used for treating the leather surface as a whole.

Leather-surface-repair composition which can be used for repairing damaged spots like scratches, cuts, imperfections and damaged or injured surfaces, is known from U.S. Pat. No. 1,506,983. These compositions substantially consist of carnauba wax, bees wax, shellac wax, dry shellac and turpentine and a color base. This composition is applied to the leather surface by means of a heated spatula or knife blade and subjected to pressure and a rubbing action for working it into a homogenous state.

All patents and publications described above are hereby incorporated by reference into the specification of this application.

DESCRIPTION OF THE INVENTION

For leather surface repair of car seats and other highly utilized leather surfaces or leather clothes which are sometimes scratched like motorcyclist jackets or trousers when the motorcyclist slips over the ground or the like, a leather surface repair composition must be stable enough to bring back to the leather surface its former abrasion resistance. For these and other leather surface repair applications a leather surface repair set.

According to one aspect of the present invention, provided is a leather-surface repair set consisting at least of a degreaser and of a composition and the composition comprising an emulsion of polyurethane and at least one pigment component and further comprising at least one further component which allows to relatively increase or to decrease the elasticity of the reacted composition.

According to another aspect of the present invention, provided is a method for surface repair of leather surfaces with the steps of treating the surface area to be repaired with a degreasing agent; applying a repair composition at least consisting of an emulsion of polyurethane to the spots to be repaired by filling the surface spots to be repaired with the emulsion and allowing the emulsion to polymerize.

It was found that a polyurethane in form of an emulsion is easy to be applied to smaller spots of leather surfaces to be repaired and allows to shape the service of the composition after being applied in a way very similar to the surface structure of the rest of the leather surface. After the repair action the composition polymerizes in a way in which sufficient flexibility of the leather surface is maintained, while the repaired surface spot is stable enough to allow a long period of use in the repaired state without losing the good look of the repaired spot. The leather-surface repair set according to the invention consists at least of a degreaser and of a composition comprising an emulsion of polyurethane and at least one pigment component and further comprises at least one further component which allows to relatively increase or decrease the elasticity of the reactive composition, i.e. the elasticity of the repaired leather surface and particularly of the colored layer which is applied to the leather surface to be repaired.

According to another object of the invention, the further component is a plasticizer, like a 2-ethylhexyladipate and/or 2-isodecyladipate, and/or a stabilizer like triisodecylphosphate. 2-ethylhexyladipate and isodecyladipate are used together as a rule, like in form of 2-ethylhexylipodecyladipate. The triisodecylphosphate, as a rule, is used together with the adipate component and this mixture will make the leather surface flexible once dry and will avoid cracking of the leather surface. The amount of these further components is selected so as to increase or decrease the elasticity of the repaired leather to the appropriate extent, taking into account that especially in cars and for motorcycles leather like on the seats or on the steering wheel is highly bonded by the weight of the driver, friction due to drivers movements and chemical stresses and strains due to the exudation of the drivers hands and sometimes dirt or fat on the hands. Typically, in the pigmented polyurethane emulsion composition, the portion in which the elasticity effecting components are applied, are 0.1 to 20 wt-%. 5 to 10% of the adipate component and 0 to 5% of the phosphate component are preferred.

In order to optimize the color of the polyurethane emulsion composition, six colors are preferred for mixing: white, black, yellow, blue, red, ocher. To mix the desired color, polyurethane emulsion compositions which are colored with said six primary colors each are mixed together at the necessary quantities.

To make an emulsion of polyurethane, water is preferred, which avoids the need of using experts to the repair job and accelerates the polymerization step.

In some cases, the composition may also include a biocide and/or anti foaming agent and/or pigments.

According to another embodiment a thickening agent, particularly an acrylic thickening agent, ammonia and/or propylene glycol and/or matting agents may be comprised in the composition to improve the repair result.

The composition may be applied manually and may be used in one or more layers according to the adsorption of the leather and/or the deepness of scratches or the like which are to be repaired. Also excellent rub resistance is a factor for good repair results. Before applying, the composition is a viscose fluid having a dry content preferably between 20 and 40% and particularly around 30%. The pH-value is preferred to be between 6 and 10 and most preferred between 7.0 and 9.0.

While a degreaser and the colored repair composition is sufficient in many cases, the leather surface repair set should also include a repairing paste of repairing leather which is stronger damaged and even may have deep scratches or holes. This repairing paste is used after degreasing and before applying the colored composition. If a repairing paste is used, this can be applied with a spatula spreading a sufficient quantity of repairing paste on the leather surface to be repaired. When the repairing paste has dried sufficiently, for instance for two minutes, and it doesn't stick any more to the fingers, a metal imprint tool may be pressed on the past to print the range of the leather before coloring the repair spot. The repairing paste preferably comprises an aqueous dispersion of polyurethanic and/or acrylic polymers and one or more inert substances. The inert substances preferably comprise an expanded polyurethane and kaolin. The polyurethanic and acryl polymers preferably are use together. Repairing paste may also comprise pigments. However, as a standard, it is not necessary to give the final color to the repairing paste. It is normally sufficient to have the repairing paste color light, i.e. with white pigments, if the final color is a light one or to add dark, like black pigments, if the final color will be a dark one. Of course, the closer coloration of the repairing paste will be to the final color, the less effort will be necessary to recoloring the leather with the pigmented polyurethane emulsion composition.

According to another object of the invention the leather surface repair set further consists of a fixer for fixing the composition on the decreased leather or on the repairing paste being applied on the decreased leather. It was found that a fixer will improve the durability of the repaired leather surface. Aqueous anionic polyurethane dispersions were found to be most favorable for the purpose of the fixer which are known as such for instance from U.S. Pat. No. 5,236,995 which is incorporated by reference herein and forms part of the specification. In combination with the aqueous an ionic polyurethane dispersion, a water miscible organic solvent may be comprised in the fixer. Particularly favorable as a water-miscible organic solvent are N-methyl-2-pyrrolidone. The fixer most favorably will be applied with the paintbrush on the clean and decreased surface—eventually after a repairing paste has been applied. After drying of fixer the colored polyurethane emulsion composition is applied and this application is, preferably, also performed by using a paintbrush and thereafter shaped by a sponge. Thanks to the fixer, it is possible to apply the colored polyurethane emulsion composition even on plastic surfaces which are sometime used as imitation of leather. Preferably, the fixer comprises 90 to 95 wt-% of an anionic polyurethane and 5 to 10 wt-% of n-methyl-2-pyrrolidone.

The leather surface repair composition according to the invention is particularly suitable inside motor vehicles like for seats, steering-wheels, door panels and the like made of leather and for motorcyclist's clothes and equipment like jackets, trousers, boots, bags and the like. It can be colored in a wide range of known colors and is used to repair the grazed, spotted or worn leather. Is an enables to restore the colored layer of the leather. The composition is applied as an liquid or a cream. For preparing the leather surface the spot to be repaired should be treated with a degreaser like "WaterfloW". The composition may be applied with a paintbrush for liquid composition, or with a cotton rag or applying the composition as a cream. A suitable surface appearance can be received when the applied composition is dabbed with a dry synthetic sponge. This treatment may be repeated of several like two or three times.

Attached hereto, two examples which each show a leather surface before and after repair action.

FIG. 1A/B showing a seat of a car

Figure 2A:
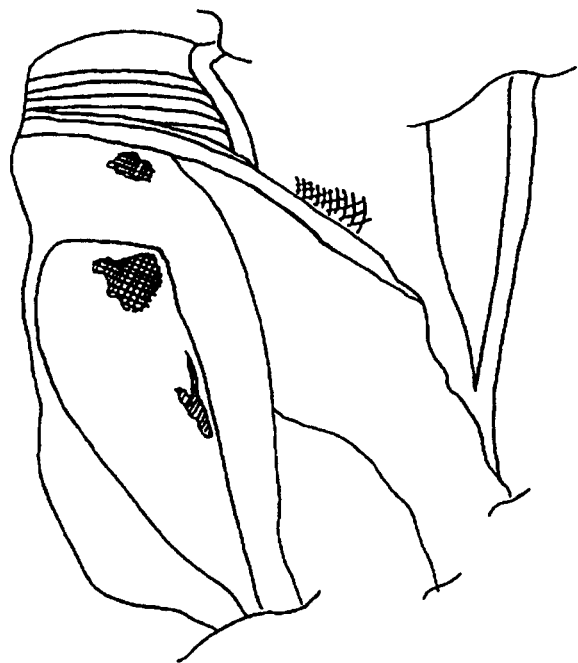
Figure 2B:
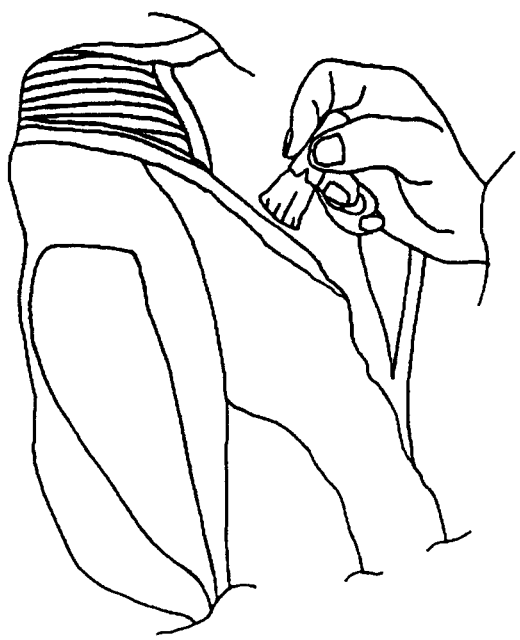

FIG. 2A/B showing a motor cyclist jacket

Figure 3A:
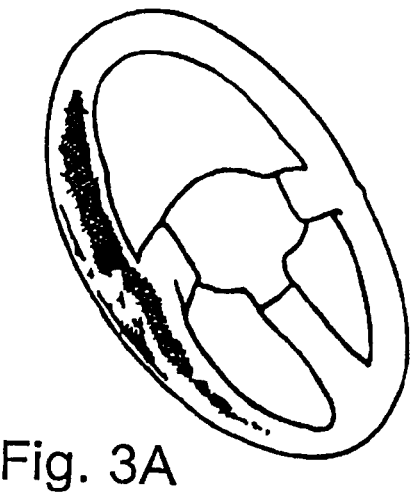
Figure 3B:
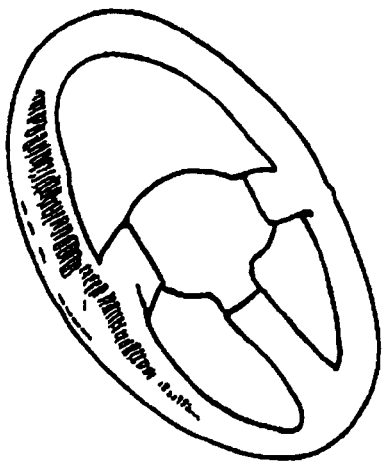
Figure 3C:
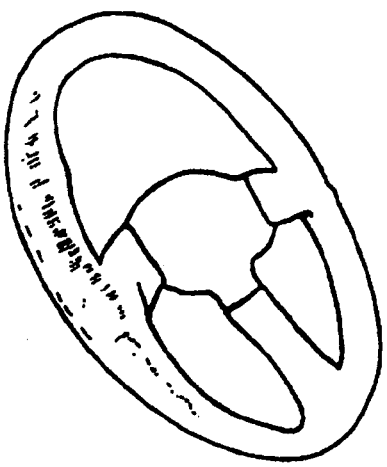
Figure 3D:
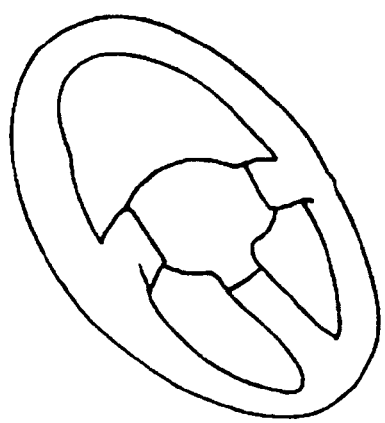

FIG. 3A/B/C/D showing a steering wheel (3B=after first treatment; 3C=after second treatment; 3D =after final treatment).

While considerable emphasis has been placed on the preferred embodiments of the invention illustrated and described herein, it will be appreciated that other embodiments and/or equivalents thereof can be made and that many changes can be made in the preferred embodiments without departing from the principles of the invention. Accordingly, it is to be distinctly understood that the foregoing descriptive matter is to be interpreted merely as illustrative of the invention and not as a limitation.

The invention claimed is:

1. A method for surface repair of leather surfaces comprising the steps of:
    treating a surface area to be repaired with a degreasing agent;
    applying a repair composition comprising an emulsion of polyurethane, at least one pigment component and at least one further component to alter the elasticity of the reacted composition, the at least one further component includes 5 to 10 wt-% of an adipate component and 0 to 5 wt.-% of a phosphate component, to the degreased surface area to be repaired by filling the surface area to be repaired with said emulsion; and
    allowing the emulsion to polymerize.

2. The method according to claim 1 further comprising the step of applying a repairing paste on the degreased leather surface area.

3. The method according to claim 2 wherein the repairing paste comprises pigments.

4. The method according to claim 3 further comprising the step of imprinting a certain grain onto the repairing paste.

5. The method according to claim 2 further comprising the step of imprinting a certain grain onto the repairing paste.

6. The method according to claim 1 further comprising the step of applying a fixer to the degreased surface area before applying the emulsion of polyurethane.

7. The method according to claim 6 wherein the emulsion of polyurethane is a colored polyurethane emulsion composition.

8. The method according to claim 7 wherein the fixer comprises at least one of an aqueous anionic polyurethane dispersion and a water-miscible organic solvent.

9. The method according to claim 1 wherein the emulsion of polyurethane is applied by a brush to the leather surface and the method further includes the step of treating the emulsion of polyurethane with a sponge or the like after the application with a brush.

10. The method according to claim 1 wherein the repair composition further comprises at least one of an ammonia, an anti foaming agent, a biocide and an iron oxide.

11. The method according to claim 1 wherein in the emulsion of polyurethane comprises water.

12. The method according to claim 1, wherein the repair composition further comprises an acrylic thickening agent.

13. The method according to claim 1, wherein the repair composition further comprises propylene glycol.

14. The method according to claim 1, wherein the repair composition further comprises between 20 and 40% of dry content before applying step.

15. The method according to claim 1, wherein the repair composition has a pH-value between 6 and 10before the applying step.

16. The method according to claim 2, wherein the repairing paste comprises at least one of an aqueous dispersion of polyurethanic, acrylic polymers and an inert substance.

17. The method according to claim 16, wherein the inert substances include expanded polyurethane and kaolin.

18. The method according to claim 6, wherein the fixer includes at least one of an aqueous anionic polyurethane dispersion and a water-miscible organic solvent.

19. The method according to claim 18, wherein the water-miscible organic solvent is a n-methyl-2-pyrrolidone.

20. The method according to claim 19, wherein the fixer comprises 90 to 95 wt-% of an anionic polyurethane and 5 to 10 wt-% of n-methyl-2-pyrrolidone.

21. The method according to claim 1 further comprising the steps of:
   applying a repair paste to the degreased surface area prior to application of the repair composition, and
   applying the fixer to the repair paste prior to application of the repair composition.

* * * * *